United States Patent [19]

Walker et al.

[11] 4,157,898

[45] Jun. 12, 1979

[54] FUSED ALUMINUM OXIDE ABRASIVE GRAIN CONTAINING REDUCED TITANIUM OXIDE

[75] Inventors: Thomas B. Walker, Lewiston; Robert J. Seider, Ransomville; Paul Cichy, Buffalo, all of N.Y.

[73] Assignee: The Carborundum Company, Niagara Falls, N.Y.

[21] Appl. No.: 896,269

[22] Filed: Apr. 14, 1978

Related U.S. Application Data

[62] Division of Ser. No. 691,817, Jun. 1, 1976, Pat. No. 4,111,668.

[51] Int. Cl.$^2$ .......................... C09K 3/14; B24D 11/00
[52] U.S. Cl. ......................................... 51/309; 51/295; 51/298; 51/308
[58] Field of Search .................. 51/295, 298, 309, 308

[56] References Cited

U.S. PATENT DOCUMENTS

| | | | |
|---|---|---|---|
| 3,181,939 | 5/1965 | Marshall | 51/309 |
| 3,216,794 | 11/1965 | Roschuk | 51/309 |
| 3,387,957 | 6/1968 | Howard | 51/309 |
| 3,615,307 | 10/1971 | Jones | 51/309 |
| 3,861,849 | 1/1975 | Richmond et al. | 51/309 |
| 3,996,702 | 12/1976 | Leahy | 51/309 |
| 4,049,397 | 9/1977 | Bockstiegel et al. | 51/309 |

*Primary Examiner*—Donald J. Arnold
*Attorney, Agent, or Firm*—David E. Dougherty; Raymond W. Green; Michael L. Dunn

[57] ABSTRACT

A fused abrasive grain, useful for inclusion in coated abrasives and bonded abrasives, consists essentially of alumina; titanium oxide containing from about 0.42 to about 0.84% titaniun, by weight of the abrasive grain, present as a reduced titanium oxide having an average oxidation state lower than in $Ti_2O_3$; from about 0.05 to about 0.3% by weight carbon; from about 0.02 to about 0.1% by weight $Na_2O$; and from 0 to about 0.1% by weight total of calcium and silicon oxides. The grain before roasting has a gain on ignition of from about 0.4 to about 0.7% by weight, and is produced in an electric furnace by fusing high-purity titania, alumina containing $Na_2O$ as the only significant oxide impurity, and carbon, followed by crushing and roasting the fused grain.

9 Claims, No Drawings

FUSED ALUMINUM OXIDE ABRASIVE GRAIN CONTAINING REDUCED TITANIUM OXIDE

This is a division of copending application Ser. No. 691,817, filed June 1, 1976 now U.S. Pat. No. 4,111,668.

BACKGROUND OF THE INVENTION

The abrasive industry constantly seeks new and improved abrasive grains for use in coated and bonded abrasive products. It is therefore an object of this invention to provide an abrasive grain for such uses having improved performance characteristics. It is a further object of this invention to avoid the use of zirconia, for while prolific patent and other literature exists attesting to the utility of fused alumina-zirconia grain as an all-around abrasive for use in both coated and bonded products, zirconium oxide is subject to price variation and other problems.

SUMMARY OF THE INVENTION

Accordingly, the present invention provides a fused abrasive grain consisting essentially of titanium oxide containing from about 0.42 to about 0.84% titanium, by weight of the abrasive grain, the titanium being present as a reduced titanium oxide having an average oxidation state lower than in $Ti_2O_3$; from about 0.05 to about 0.3% by weight carbon; from about 0.02 to about 0.1% by weight $Na_2O$; from about 0 to about 0.1% by weight total calcium and silicon oxide; and alumina; the abrasive having a gain on ignition in air at 1300° C., when of a size of about 147 microns and finer, of from about 0.4 to about 0.7% by weight before roasting. Such a grain, useful for example in coated abrasives, with or without a base layer of abrasive grain of diverse composition, and in bonded abrasives bonded with vitrified ceramic bonds or phenolic resin bonds, can be produced from high-purity titania, alumina containing soda as the only oxide impurity present in an amount in excess of 0.1% by weight, and carbon.

DETAILED DESCRIPTION

This invention relates to a fused aluminum oxide abrasive grain containing reduced titanium oxide. By "reduced" titanium oxide, it is meant that the titanium oxide is present with an average oxidation state lower than that in $Ti_2O_3$, in contrast to the usual oxidation state of titanium in titanium dioxide, $TiO_2$. This titanium oxide should be present in an amount such that there is from about 0.42 to about 0.84% titanium, by weight of the abrasive grain. As titanium is usually analytically determined as $TiO_2$, this means that the apparent $TiO_2$ concentration should be from about 0.7 to about 1.4% by weight. This relationship obtains because $TiO_2$ is about 60.0% by weight titanium.

The second intentional additive ingredient of the abrasive grain of the present invention is carbon. Carbon should be present in an amount from about 0.05 to about 0.3% by weight of the abrasive grain. Carbon is purposely added as part of the furnace charge in fusing the abrasive grain of the present invention, and according to the preferred process for producing the fused abrasive grain of the present invention, also enters the reaction mix from the carbon electrodes which are used in the electric furnace. The amount of carbon added depends upon the amount of titania and $Na_2O$ present in the reaction mix, as sufficient carbon is added at least to reduce the titanium below its oxidation state in $Ti_2O_3$, and to reduce the $Na_2O$ to metallic sodium. The metallic sodium then volatilizes from the reaction mixture, being reconverted to $Na_2O$ when it leaves the reducing atmosphere adjacent to the reaction zone of the furnace. Carbon monoxide, CO, is also given off as a by-product.

Sodium oxide is present as an impurity in the alumina, and should be controlled to less than about 0.1% by weight $Na_2O$. It is uneconomical to remove the last traces of $Na_2O$, and accordingly, a minimum concentration of 0.02% by weight $Na_2O$ is all that is economically feasible. The range of $Na_2O$ present in the fused abrasive grain according to the present invention should therefore range from about 0.02 to about 0.1% by weight.

Calcium and silicon oxides are frequently present in alumina in minor degree. Their presence is not harmful if present at a level less than about 0.1% by weight.

The balance of the material is, of course, alumina.

An important feature of the present invention is the amount of gain on ignition. The gain on ignition is a measure of the oxidation state of the titanium oxide and of the amount of carbon present. While various conditions could be used for determining the gain on ignition, a standard which has been used in determining the proper oxidation state of the grain for the present invention is the gain on ignition in air at 1300° C. when the abrasive has been crushed and graded to a size of about 147 microns (100 mesh) and finer, and heated for 2 hours. This test is done before roasting the grain. The desired gain on ignition is from about 0.4 to about 0.7% by weight under these conditions.

Within the above broad limits, it is preferred that the fused abrasive grain according to the present invention consists essentially of titanium oxide containing about 0.72% titanium, by weight of the abrasive grain, the titanium being present in an oxidation state lower than in $Ti_2O_3$ (which would be equivalent to 1.2% $TiO_2$, if oxidized to $TiO_2$); about 0.2% by weight carbon; about 0.05% by weight $Na_2O$; and about 98.5% by weight $Al_2O_3$; the abrasive having a gain on ignition under the conditions specified above of about 0.5% by weight.

The abrasive grain according to the present invention is useful in coated abrasive products such as belts and discs, as well as bonded abrasive products such as grinding wheels. In the case of a coated abrasive product, the first component of the product is a flexible backing, such as paper or cloth. The coated abrasive product also comprises abrasive grains comprising reduced titanium oxide according to the present invention, and an adhesive bonding the abrasive grain to the flexible backing. The adhesive is a conventional, and usually comprises a making coat of a conventional material such as phenolic resin containing a calcium carbonate filler, which serves to coat the flexible backing prior to application of the abrasive grain; and a size coat of conventional material such as phenolic resin containing a reactive filler, which serves to cover the making coat and the abrasive grain and more firmly bond the abrasive grain to the flexible backing. The abrasive grain used in such a coated abrasive product can either be entirely the abrasive grain comprising reduced titanium oxide according to the present invention, or can comprise in addition a base layer of abrasive grain, which is applied to the flexible backing having thereon a making adhesive coat, prior to application of the abrasive grain of the present invention. The use of a base coat of abrasive grain is conventional per se, and provides a substrate upon which the abrasive grains of the present invention can be mounted.

Bonded abrasives according to the present invention comprise abrasive grain comprising reduced titanium oxide, as well as a bonding matrix of a conventional material such as phenolic resin or vitrified ceramic bond.

The preferred process for producing the fused abrasive grain according to the present invention comprises steps of charging an electric furnace; subjecting the mixture of ingredients within the electric furnace to the heat of an electric arc, to melt the mixture; solidifying the melted mixture; crushing the solidified mixture; and roasting the crushed grain. The mixture to be charged to the electric furnace preferably comprises from about 0.7 to about 1.7 parts by weight of high-purity titania, such as "electronic grade" titania. It is preferred that the titania contain at least 99% $TiO_2$, to avoid the introduction of unwanted impurities into the abrasive grain. A second raw material added to the furnace is preferably from about 98.6 to about 99.3 parts by weight of alumina containing $Na_2O$ as the only oxide impurity present in a significant amount (i.e., in excess of about 0.1% by weight), for example tabular alumina having a maximum $Na_2O$ content of 0.15%. The $Na_2O$ content of the alumina raw material should be as low as convenient, as excess $Na_2O$ must be reduced by reaction with carbon to leave less than about 0.1% by weight $Na_2O$ in the finished product. Suitable alumina contains 0.3–0.6% $Na_2O$.

The third ingredient charged to the electric furnace of the present invention is carbon, such as calcined petroleum coke or graphite, in an amount from 1 to 10 times the theoretical amount necessary, based on the amount of $TiO_2$ and $Na_2O$ added, to reduce the $TiO_2$ and $Na_2O$. As used herein, the amount necessary to reduce the $TiO_2$ and $Na_2O$ is considered according to the following formulas:

$$2TiO_2 + C = Ti_2O_3 + CO, \text{ and} \qquad (i)$$

$$Na_2O + C = 2Na + CO. \qquad (ii)$$

It is to be recognized, of course, that the $TiO_2$ will be reduced to an average titanium oxidation state less than in $Ti_2O_3$, and in particular it has been found that the average formula is more on the order of $TiO_{0.9}$. The reduction to the state $Ti_2O_3$ serves as a convenient benchmark in calculating the amount of carbon to add, however. The amount of carbon necessary to be added can be grossly estimated from the amount of $TiO_2$ and $Na_2O$ present. By using carbon electrodes, however, additional carbon will be added to the reaction mixture from the carbon electrodes. It is also desirable to use additional carbon past the theoretical amount necessary to reduce the $TiO_2$ and $Na_2O$ to $Ti_2O_3$ and Na, respectively, in an amount of from about 3 to 10 times the calculated amount. Within this range, from about 4 to 7 times the theoretical amount necessary, based on the amount of $TiO_2$ and $Na_2O$ added, to reduce the $TiO_2$ and $Na_2O$ to $Ti_2O_3$ and Na, respectively, is preferred. The carbon can be in any convenient form, but finely divided calcined petroleum coke and graphite are preferred.

Various alumina sources can be used, but they should preferably be of relatively high purity and contain no oxide impurities other than $Na_2O$ (or, of course, titanium oxides) in significant amounts, i.e., in excess of 0.1% by weight. An acceptable alumina source is calcined alumina, which can contain, for example, from about 0.4 to about 0.6% $Na_2O$ as an impurity.

According to the best mode now contemplated, the mixture of ingredients to be charged to the electric furnace comprises 1.4 parts by weight $TiO_2$ (allowing 0.2 parts to settle to the bottom of the furnace as combined titanium compounds, leaving the equivalent of 1.2 parts $TiO_2$ in the abrasive) and 98.5 parts by weight alumina containing $Na_2O$ as the only oxide impurity present in an amount in excess of 0.1% by weight. The amount of carbon to be added depends on the amount of $Na_2O$ present, as discussed above.

The mixture of titania, alumina and carbon is subjected within the electric furnace to the heat of an electric arc, the electric arc being a reducing arc passed from carbon electrodes to the mixture of titania, alumina, and carbon, for a time sufficient to melt the mixture. The term "reducing arc" is well known to those skilled in the electric furnace art, and is a relatively short arc produced by controlling the power input, phase voltage, electrode spacing, power factor, circuit configuration (single-phase or three-phase), and the like. As an example, the electric arc can be supplied by a single-phase power supply at a voltage of about 80 volts and a power input of from about 100 to about 120 kilowatts.

After the mixture of titania, alumina and carbon is melted, it is solidified. It is highly preferred that this be accomplished by pouring the melted mixture into a cooling mold such as a water-cooled steel pan. A depth of melted mixture to be solidified of from about 2.5 to about 15 centimeters, more particularly from about 2.5 to about 6 centimeters, is preferred. An alternate cooling method is "ball casting", i.e., pouring the melted mixture into a solidification chamber containing steel spheres having a diameter ranging from about 5 to about 60 millimeters, more preferably of about 20 millimeters. Details of the ball casting process and apparatus for use therein are given in P. Cichy U.S. Pat. No. 3,726,621; W. Q. Richmond and P. Cichy U.S. Pat. Nos. 3,861,849 and 3,928,515; W. Q. Richmond U.S. patent application Ser. No. 314,319 filed Dec. 12, 1972; P. Cichy U.S. patent application Ser. No. 492,628, filed July 29, 1974; and W. Q. Richmond U.S. patent application Ser. No. 565,978, filed Apr. 7, 1975. All three of the indicated patents and all three of the indicated applications are assigned to The Carborundum Company, the assignee of the present invention.

In any event, regardless of the cooling apparatus used, it is desired to prevent reoxidation of the reduced titanium oxide which is obtained by subjecting the mixture of titania, alumina and carbon to a reducing arc as indicated above. In order to prevent this reoxidation of the titanium, it is preferred that the length of the pouring stream from the electric furnace to the cooling mold be minimized, and the pour rate maximized, insofar as practical.

After the melted mixture is solidified, it is crushed to obtain abrasive grain and "roasted" by subjecting the crushed grain to an oxidizing atmosphere, preferably air, for a time of from about 5 minutes to about 64 hours or more at a temperature of from about 1250° C. to about 1450° C. The time of roasting more particularly is preferred to range from about 5 to about 20 minutes, optimum 10 minutes; and the temperature of roasting preferably ranges from about 1300° to about 1350° C., optimum 1300° C.

The product, as produced, should be bluish black in color. A reddish brown appearance indicates that the titanium is present in an oxidation state greater than desired. Such off-color material should be refurnaced to further reduce the titanium oxide present. The lumps exhibit a "glassy" conchoidal fracture which is suggestive of large crystal size. The titanium may be combined with carbon and oxygen to form a titanium oxycarbide, and although the chemical identity of the titanium compounds present is not critical, the titanium must be present in a form which has a very low solubility in aluminum oxide. The titanium compound is present as an easily recognizable second phase, which may also contain aluminum oxide or aluminum oxycarbide. Freshly fractured crude abrasive (i.e., solidified melt, prior to crushing to obtain abrasive grain) has a "carbidic" odor, a condition well known to those skilled in the art as indicative of over-reduction of the aluminum oxide fusion. This odor is produced upon contact with water of water vapor (or even high-humidity air).

The rate of cooling the melted mixture to solidify the same is rapid, in order to ensure that crystals grow in highly-oriented columns. Equivalent "grain" diameters of between 0.25 and about 2.5 millimeters, with a median of about 1.2 millimeters, have been observed. This is unusually large for thin cast alumina.

The "grains" (crystalline columns within an abrasive granule) exhibit a cellular substructure. The individual cells which have an equivalent diameter of between 0.06 and 0.1 millimeters are clearly outlined in photomicrographs of thin sections cut perpendicular to the direction of solidification, by the titanium-rich second phase. These cells appear to be alumina dendrites. These dendrites appear to be a stack of rhombohedral crystallite units which share a common "c" axis. These columnar cells may, in some instances, be twinned stacks of rhombohedral units.

The structure of the abrasive grain of the present invention is the result of the rate of solidification and the presence of an impurity phase which has a very low solubility in alumina. This impurity phase may limit lateral growth and branching of the dendrite columns. It has been established that, if the contained titanium is in a higher state of oxidation which permits solubility in alumina, the typical, desired cellular dendritic structure cannot be achieved at the solidification conditions normally used.

Photomicrographs of sections cut parallel to the direction of solidification reveal the columnar nature of the cell substructure of the primary grains. The minor impurity phase can be seen to be concentrated at the cell boundaries. In fact, it is precisely this impurity concentration which makes it possible to recognize the existence of the cellular substructure. In metallurgical practice the substructure elements are sometimes called "impurity cells". These impurity cells, at low magnification, on planes parallel to the alumina "c" axis, sometimes exhibit a "feathery" or chevron pattern similar to that described by Baumann and Woodell in U.S. Pat. No. 2,383,035.

During crushing, it has been observed that there is a distinct tendency for the large pieces to break more or less parallel to the direction of solidification. It appears that the grain fractures along the grain and cell boundaries, and it is believed that this fracture tendency will persist in the smaller granules which are incorporated into bonded and coated abrasive products. This property tends to favor production during crushing of elongated grit size particles which have a low bulk density. The particles also tend to have the very sharp, jagged edges and stepped fracture surfaces.

It has also been observed, qualitatively, that elongated fragments of the abrasive of the present invention have a high resistance to breaking in a direction perpendicular to the direction of solidification. This apparent anisotropy may also persist in final grit size particles. It is possible that it is a property of the "fiber bundle"-like structure described above.

The combination of high alpha alumina content, relatively low porosity and friability, plus a tendency to directional fracture with the production of exceptionally sharp, jagged, edges and faces, all result in high performance in certain abrasive applications. On coated abrasive products, both abrasive discs and abrasive belts, the grain of the present invention has performed from 15 to 90% better than standard bauxite-based alumina. In bonded abrasive products, particularly relatively thin "cut-off" wheels, 2 to 3 times standard grain performance has been demonstrated.

The invention will now be illustrated with several examples.

A. Preparation of Grain

EXAMPLE 1

A tilting electric arc furnace was used, being equipped with two graphite electrodes for single-phase operation. The furnace has a nominal capacity of 100 kilowatts.

The charge to the furnace consists of high purity alumina, high purity titanium dioxide, and carbon in the form of graphite. The amount of carbon was calculated from the stoichiometric ratios for the reaction $TiO_2 + C = Ti_2O_3 + CO$. The weight ratio from this reaction is calculated at 7.51%, i.e., 7.51 grams of carbon for each 100 grams of $TiO_2$. Using this ratio, 100% of the calculated stoichiometric amount of carbon was used, based only on the $TiO_2$ content. Since the tabular alumina contained a maximum of 0.05% $Na_2O$, the $Na_2O$ required no reduction. The furnace charge was therefore calculated as 1.33 parts by weight of electronic grade titania; 0.10 parts by weight of graphite; and 98.57 parts by weight of tabular alumina containing a maximum of 0.05% $Na_2O$ (sold under the Alcoa designation "T61").

This mixture of titania, alumina and carbon was then subjected to the heat of an electric arc, the electric arc being a reducing arc passed from carbon electrodes to the mixture of titania, alumina and carbon, the voltage applied being 80 volts for a power input rate of 100–120 kilowatts. This voltage-power relationship was used to ensure a short "reducing" arc.

The charge ingredients were premixed and fed into the furnace at a rate of about 68 kilograms per hour to maintain a feed layer of unmelted ingredients approximately 2.5 centimeters thick on top of the molten bath. This charge is almost completely melted down before pouring.

During pouring, the length of the pouring stream is minimized and the pour rate is maximized to limit the oxidation of the titanium oxide in the bath. The melted mixture was cast into a 52 centimeter diameter mold with steel walls and a 5 centimeter thick graphite base. Castings of from 2.5 to 10 centimeters were poured. Casting weights varied from about 13.6 to about 43.1 kilograms.

After the melted material had solidified, grain was prepared in a conventional manner by crushing cast material through a jaw crusher and roll crusher, followed by sieving to separate desired grit sizes. The grain was roasted in air at a temperature of 1300° C. for 5 to 20 minute periods. Roasting decreased the ball mill friability (A.G.A. standard test procedure) and the bulk density of the 14 grit grain as set out in Table 1.

Table 1

|  | Unroasted Grain | Roasted 5 Minutes | Roasted 20 Minutes |
| --- | --- | --- | --- |
| Bulk Density, g/cc | 2.05 | 1.97 | 1.88 |
| Friability % | 29.2 | 22.4 | 20.1 |

EXAMPLES 2–5

Example 1 was repeated, using a standard roasting condition and substituting calcined petroleum coke of 10–30 mesh size for the graphite of Example 1, and varying the proportions of ingredients to increase the ratio of carbon added to the calculated stoichiometric amount as indicated in Example 1. For Examples 2–5, the roasting was for 10 minutes at 1300° C.

The parts by weight of furnace charge for Examples 2–5, and the percentage of the calculated stoichiometric amount of carbon used, are set out in Table 2.

Table 2

| Example | 2 | 3 | 4 | 5 |
| --- | --- | --- | --- | --- |
| Alumina | 98.53 | 98.42 | 98.31 | 97.91 |
| Titania | 1.36 | 1.36 | 1.36 | 1.35 |
| Carbon | 0.11 | 0.22 | 0.33 | 0.74 |
| Total Parts By Weight | 100.00 | 100.00 | 100.00 | 100.00 |
| Percent of Stoichiometric Carbon | 104 | 208 | 312 | 730 |

EXAMPLES 6–8

Example 1 was again repeated, substituting a tabular alumina containing additional $Na_2O$ for the tabular alumina containing a maximum 0.05% $Na_2O$ of Example 1. Using the equation $Na_2O + C = 2Na + CO$, the stoichiometric ratio of carbon to $Na_2O$ was calculated at 19.4%, i.e., 19.4 grams carbon per 100 grams of $Na_2O$. The furnace charges were varied as set out in Table 3, taking account of the varying $Na_2O$ concentration.

Table 3

| Example | 6 | 7 | 8 |
| --- | --- | --- | --- |
| Alumina | 98.44 | 98.41 | 98.30 |
| Titania | 1.36 | 1.36 | 1.36 |
| Carbon | 0.20 | 0.23 | 0.34 |
| Total Parts By Weight | 100.00 | 100.00 | 100.00 |
| Percent of Stoichiometric Carbon | 160 | 173 | 258 |

EXAMPLE 9

Example 6 was again repeated, using 148% of the calculated stoichiometric amount of carbon.

EXAMPLES 10–15

The same procedure as set forth in Example 1 was followed except that the operating voltage was 100 volts and the average energy input was 150 kilowatts. The energy consumption was about 2.2 kw-hours per kilogram of melt poured. Three melt cooling methods were applied, namely, cooling in sheets about 6.3 millimeters thick (Examples 10 and 11); cooling in bricks about 10 centimeters thick (Examples 12 and 13); and cooling by casting into a bed of steel balls about 19 millimeters in diameter (Examples 14 and 15). The product after melting had the following analysis:

| Titanium, determined as $TiO_2$, | 1.26%;* |
| --- | --- |
| Silica, $SiO_2$, | 0.03%; |
| Soda, $Na_2O$, | 0.02%; |
| Remainder assumed to be $Al_2O_3$. | |

*Actually present in an oxidation state less than $Ti_2O_3$. The indicated titanium concentration is 0.756% Ti.

The cooled crude abrasive was crushed separately to obtain grain samples. The bulk densities and standard friabilities of the material, of 14 grit size, together with the times and temperatures at which these materials were roasted, are set out in Table 4.

Table 4

| Example | Cooling Method | Roasting Temp. | Roasting Time | Bulk Density, g/cc | Standard Friability, Percent |
| --- | --- | --- | --- | --- | --- |
| 10 | (1) | 1350° C. | 5 min. | 2.00 | 20.0 |
| 11 | (1) | 1350° C. | 20 min. | 1.99 | 18.8 |
| 12 | (2) | 1350° C. | 5 min. | 2.00 | 22.4 |
| 13 | (2) | 1350° C. | 20 min. | 2.00 | 20.1 |
| 14 | (3) | 1300° C. | 10 min. | 1.98 | 21.8 |
| 15 | (3) | 1300° C. | 4 hrs. | 1.99 | 18.5 |

(1) Cast in 6.3 mm thick sheets.
(2) Cast in 10 cm thick bricks, 30.5 × 30.5 cm.
(3) Cast over 19 mm steel balls.

EXAMPLES 16–25

14 grit grain, produced as indicated above for Examples 10–15, was subjected to roasting at various temperatures and for various times. The bulk densities and standard friabilities of the grain are set forth in Table 5.

Table 5

| Example | Cooling Method | Roasting Temp. | Roasting Time Hrs. | Bulk Density, g/cc | Standard Friability, Percent |
| --- | --- | --- | --- | --- | --- |
| 16 | (1) | 1350° C. | 16 | 2.03 | 13.2 |
| 17 | (1) | 1350° C. | 64 | 2.03 | 13.4 |
| 18 | (2) | 1250° C. | 1 | 1.99 | 19.2 |
| 19 | (2) | 1250° C. | 3 | 1.99 | 18.4 |
| 20 | (2) | 1350° C. | 1 | 1.99 | 18.1 |
| 21 | (2) | 1350° C. | 3 | 1.99 | 18.1 |
| 22 | (2) | 1350° C. | 6 | — | 14.5 |
| 23 | (2) | 1350° C. | 16 | — | 15.2 |
| 24 | (2) | 1450° C. | 1 | 1.99 | 18.1 |
| 25 | (2) | 1450° C. | 3 | 1.98 | 18.6 |

(1) Cast in 6.3 mm thick sheets
(2) Cast in 10 cm thick bricks, 30.5 × 30.5 cm.

B. Coated Abrasive Products

EXAMPLES 26–27

Abrasive grain produced as indicated above for Examples 12, 13 and 18–25, but roasted for 10 minutes at 1300° C., was incorporated into coated abrasive products as follows:

An appropriate amount of making adhesive, containing 50% phenolic resin of approximately 70% solids content and 50% of a finely divided calcium carbonate filler, having a viscosity of about 2300 cps, was coated onto a standard cloth backing material. The amount of making coat was varied depending upon the grit size of abrasive grain to be produced, as set out in Table 6.

After the cloth had been coated with the making coat, it was passed over a supply of abrasive grain according to the invention, as described above. Appropriate amounts of the proper size of grain, as set out in Table 6, were then coated onto the making coat by electrostatic coating, i.e., by charging the backing material and the abrasive grains with opposite electric charges, so that the abrasive grains are propelled into the coated abrasive backing material in the desired orientation, i.e., with the elongated direction of the grains being approximately perpendicular to the coated abrasive backing.

The making coat was then dried and cured, to securely hold the grains on the cloth backing. A second adhesive or size coat, containing 50% phenolic resin of 70% solids content and 50% of a reactive filler, the size coat having a viscosity of about 1100 cps, was then applied. The amounts of size coat are likewise set out in Table 6. The size coat was then dried and cured.

Table 6

| Example | 26 | 27 |
|---|---|---|
| Grit Size | 36 | 40 |
| Making Coat (Measured wet) | 274 g/m² | 281 g/m² |
| Abrasive Grain | 888 g/m² | 784 g/m² |
| Size Coat (Measured wet) | 414 g/m² | 325 g/m² |

The coated abrasive sheet material, made as above, was then fabricated into coated abrasive belts of a standard size, having 36 or 40 grit abrasives. These belts were subjected to grinding tests in order to determine the efficiency of the grain. A run of 36 grit material similar to Example 26 was made using conventional aluminum oxide grain. This material was used for a control. In the case of 40 grit, a standard production run of material using similar materials and conventional aluminum oxide was used for a control. The belts were tested on a double spindle backstand polishing lathe with a constant pressure infeed device equipped with a 35.5 centimeter diameter, 5 centimeter wide rubber contact wheel of 70 A durometer hardness, having a land to groove ratio of 1:2. For all tests described in Examples 26 and 27, the abrasive belt was turned at a rate to give 5000 surface feet per minute of contact. For all tests, the material ground was 1 inch by 1 inch cold rolled No. 1018 steel.

For the 36 grit test, the steel bar was fed into the coated abrasive belt with 36 pounds of force, resulting in 36 pounds per square inch of pressure. During each test, several steel bars were alternated in grinding. The steel bars were first weighed, then placed in the grinding machine for 30 seconds per contact, weighed again and water-cooled. This procedure was repeated with alternate steel bars and the test was continued until an individual contact cut 20 grams or less of steel. The number of cuts obtained with the coated abrasive belt before reaching the level of 20 grams per cut, as well as the total amount of steel cut by the belt before reaching this level, are recorded as an indication of the grinding efficiency of that belt. The results of three belts of grain according to the invention and three belts of the standard aluminum oxide control are set out in Table 7.

Table 7

| Grain Type | Grams of Steel Removed | Number of Cuts | Average Grams of Steel/Cut |
|---|---|---|---|
| Invention, Run 1 | 1485 | 21 | 70.7 |
| Invention, Run 2 | 1484 | 21 | 70.7 |
| Invention, Run 3 | 1467 | 20 | 73.3 |
| Control, Run 1 | 728 | 12 | 60.7 |
| Control, Run 2 | 734 | 13 | 61.2 |
| Control, Run 3 | 677 | 12 | 56.4 |

For Example 27, a similar test was performed with 40 grit abrasives, except that in the case of the finer 40 grit abrasive material, the force applied was 53 pounds, giving a pressure of 53 pounds per square inch, and the contact time was only 20 seconds per contact instead of 30. The 40 grit tests were also terminated when 20 grams or less were cut in a 20-second contact. The results of three belts of grain according to the invention and three belts of a conventional aluminum oxide commercial standard are listed in Table 8.

Table 8

| Grain Type | Grams of Steel Removed | Number of Cuts | Average Grams of Steel/Cut |
|---|---|---|---|
| Invention, Run 1 | 1269 | 30 | 42.3 |
| Invention, Run 2 | 1318 | 30 | 43.9 |
| Invention, Run 3 | 1215 | 29 | 41.9 |
| Control, Run 1 | 596 | 16 | 37.2 |
| Control, Run 2 | 627 | 18 | 34.8 |
| Control, Run 3 | 577 | 16 | 36.1 |

EXAMPLES 28–30

Additional abrasive material, produced as indicated above for Examples 8, 8 and 9, for Examples 28, 29 and 30, respectively, was incorporated into abrasive belts. In Example 28, the abrasive belts were double-coated by applying first a standard aluminum oxide grain, and then applying grain of the invention over the first coat of abrasive grain, thus using the aluminum oxide grain as a substrate. For Examples 29 and 30, a single coating of abrasive grain according to the invention was applied. For both 36 and 50 grit grain, a control of standard aluminum oxide grain, for which the coated abrasive was made in the same manner as indicated for Example 29 and 30, except for the grain type, was tested. The results of the standard test of these abrasive belts are set forth in Table 9.

Table 9

| | Grams Removed In Standard Test | |
| Example | 36 Grit | 50 Grit |
|---|---|---|
| 28 | 1118 | 995 |
| 29 | 1045 | 948 |
| 30 | 1000 | 1061 |
| Alumina Control | 701 | 878 |

EXAMPLES 31–34

The same grains as used in Examples 28–30 were coated onto fiber to produce fiber coated abrasive discs. Example 31 was abrasive produced as indicated in Example 8, single coated. Example 32 was abrasive produced as indicated in Example 8, double coated as indicated in Example 28. Example 33 was abrasive grain produced as indicated in Example 9, single coated. Example 34 was abrasive produced as indicated in Example 9, and double coated as indicated in Example 28. The control for these examples was a standard fiber disc similar to Examples 31 and 33, except that aluminum oxide abrasive grain was substituted for the abrasive grain of the invention.

The results of a standard test for these fiber discs and the control are set out in Table 10.

Table 10

| | Grams Cut In Standard Test | | |
|---|---|---|---|
| Example | 36 Grit | 50 Grit Lot "A" Steel | 50 Grit Lot "B" Steel |
| 31 | 171 | — | — |
| 32 | 166 | — | — |
| 33 | 175 | 88 | 135 |
| 34 | — | 79 | 106 |
| Alumina Control | 93 | 57 | 79 |

C. Bonded Abrasive Products

EXAMPLES 35-44

Bonded abrasives were produced using abrasive grain of the invention using the same procedure as that used for conventional phenolic resin bonded grinding wheels. The grain was wetted in a mixer with a blend of furfural-cresol in an amount of 1 cubic centimeter of blend for each kilogram of mix; a liquid phenolic resin was then added to the mixer and dispersed on the wetted grain for 2 minutes; 75% of the powdered phenolic resin and all of the filler was added to the mixer and mixed for a few minutes. The remainder of the powdered phenolic resin was added over a period of a few minutes. The last step is the addition of up to 10 cubic centimeters per kilogram of powdered resin of creosote oil to control the characteristics of the mix. The formulation used was as set out in Table 11.

Table 11

| | Weight Percent |
|---|---|
| 14 Grit Abrasive | 41.4 |
| 16 Grit Abrasive | 20.7 |
| 20 Grit Abrasive | 20.6 |
| Liquid Phenolic Resin | 3.0 |
| Powdered Phenolic Resin | 6.8 |
| Filler | 7.5 |
| TOTAL: | 100.0 |

The mix was then loaded into a mold and fiberglass reinforcing was incorporated into the filling at appropriate intervals to give a strength capable of operating at 12,500 surface feet per minute. The assembled mold was pressed to a specific size, the wheel stripped, loaded on a curing bat, lugged, weighed and placed in an oven for curing. The curing was accomplished over a two-day period, with hold time of 9 hours at a maximum temperature of about 180° C. The wheels were removed from the oven and finished to the appropriate tolerances.

By this manner, 20×2×12" wheels were made containing standard aluminum oxide abrasive and four types of abrasive according to the invention. These wheels were then run on a floor stand grinder operating at 12,500 surface feet per minute, grinding 1 inch×2 inch faces of malleable iron with standard operator pressure. The results of this test are set forth in Table 12.

Table 12

| Example | Grain Type | (1) Metal Removed Grams | (2) Wheel Loss Grams | (3) Grinding Ratio (1)/(2) | (4) Grinding Rate, kg/min | (5) Quality Factor (3) × (4) |
|---|---|---|---|---|---|---|
| 35 | Example 14 | 9471 | 127.0 | 74.6 | 0.987 | 73.6 |
| 36 | Example 15 | 9244 | 147.0 | 62.9 | 1.422 | 89.4 |
| 37 | * | 9471 | 156.5 | 60.5 | 1.170 | 70.8 |
| 38 | ** | 8677 | 134.3 | 64.6 | 9.86 | 63.7 |
| Control | Alumina | 8958 | 166.5 | 53.8 | 6.84 | 36.8 |

*Similar to Example 14, but cast in 10 cm thick bricks, 30.5 × 30.5 cm.
**Similar to Example 15, but cast in 10 cm thick bricks, 30.5 × 30.5 cm.

In a similar manner, but with minor modifications in the mix formulation and the pressing and curing, 6×6×⅜-inch, type 11 wheels were made and finished. No glass reinforcing was used in the construction. The mix formulation was as set out in Table 13.

Table 13

| | Weight Percent |
|---|---|
| 14 Grit Abrasive | 41.5 |
| 16 Grit Abrasive | 20.8 |
| 20 Grit Abrasive | 20.7 |
| Liquid Phenolic Resin | 3.5 |
| Powdered Phenolic Resin | 8.5 |
| Filler | 5.0 |
| TOTAL: | 100.0 |

These wheels were evaluated by running on a portable air grinder operating at 6000 rpm, grinding a piece of flat cast steel for 30 minutes with a standard operator pressure. The results of this evaluation are set out in Table 14.

Table 14

| Example | Grain Type | (1) Metal Removed Grams, | (2) Wheel Loss Grams | (3) Grinding Ratio (1)/(2) | (4) Grinding Rate, g/min | (5) Quality Factor, (3) × (4) |
|---|---|---|---|---|---|---|
| 39 | Example 14 | 2080 | 122 | 17.0 | 23.1 | 393 |
| 40 | Example 15 | 2686 | 230 | 11.7 | 29.8 | 349 |
| 41 | * | 2784 | 220 | 12.7 | 30.9 | 392 |
| 42 | ** | 2048 | 164 | 12.5 | 34.1 | 426 |
| Control | Alumina | 2644 | 289 | 9.15 | 29.4 | 269 |

*Similar to Example 14, but cast in 10 cm thick bricks, 30.5 × 30.5 cm.
**Similar to Example 15, but cast in 10 cm thick bricks, 30.5 × 30.5 cm. (Example 42 is summation of testing 2 wheels; Examples 39-41 and control are the summation of 3 wheels each).

Similarly, type 27 depressed center 7×¼×⅞" wheels were mixed, molded, and cured, incorporating the standard glass fiber reinforcement. The formation used was 80% 24 grit abrasive, 3% liquid phenolic resin, 10% powdered phenolic resin, and 7% filler. These wheels were evaluated by running a portable air grinder operating at 6000 rpm, grinding 1½×1½" angle iron for 15 minutes with a standard operator pressure. The results of this test are set out in Table 15.

Table 15

| Example | Grain Type | (1) Grams Metal Removed | (2) Grams Wheel Loss | (3) Grinding Ratio (1)/(2) | (4) Grinding Rate, g/min. | (5) Quality Factor (3) × (4) |
|---------|------------|-------------------------|----------------------|----------------------------|---------------------------|------------------------------|
| 43 | Example 14 | 1684 | 191 | 8.82 | 37.4 | 330 |
| 44 | * | 1792 | 223 | 8.03 | 39.8 | 318 |
| Control | Alumina | 1674 | 234 | 7.15 | 37.2 | 266 |

*Similar to Example 14, but cast in 10 cm thick bricks, 30.5 × 30.5 cm. (Examples 43–44 and control are the summation of 3 wheels each).

The same wheels were then evaluated grinding flat cast steel for 30 minutes, using the same grinder at normal operator pressure. The results are set out in Table 16.

Table 16

| Example | Grain Type | (1) Grams Metal Removed | (2) Grams Wheel Loss | (3) Grinding Ratio (1)/(2) | (4) Grinding Rate, g/min. | (5) Quality Factor (3) × (4) |
|---------|------------|-------------------------|----------------------|----------------------------|---------------------------|------------------------------|
| 43 | Example 14 | 1578 | 57 | 27.6 | 17.5 | 483 |
| 44 | * | 1578 | 55 | 28.7 | 17.5 | 502 |
| Control | Alumina | 1224 | 45 | 27.2 | 13.6 | 370 |

*Similar to Example 14, but cast in 10 cm thick bricks, 30.5 × 30.5 cm. (Examples 43–44 and control are the summation of 3 wheels each)

What is claimed is:

1. A fused abrasive grain which is bluish black in color consisting essentially of:
   (1) titanium oxide containing from about 0.42 to about 0.84% titanium, by weight of the abrasive grain, said titanium being present as a reduced titanium oxide having an average oxidation state lower than in $Ti_2O_3$;
   (2) from about 0.05 to about 0.3% by weight carbon;
   (3) from about 0.02 to about 0.1% by weight $Na_2O$;
   (4) from 0 to about 0.1% by weight total of calcium and silicon oxides; and
   (5) alumina; said abrasive having a gain on ignition in air before roasting at 1300° C., when of a size of about 147 microns and finer, of from about 0.4 to about 0.7% by weight.

2. A fused abrasive grain according to claim 1, consisting essentially of:
   (1) titanium oxide containing about 0.72% titanium, by weight of the abrasive grain;
   (2) about 0.2% by weight carbon;
   (3) about 0.05% by weight $Na_2O$; and
   (4) about 98.5% by weight alumina; and having a gain on ignition of about 0.5% by weight.

3. A coated abrasive product comprising:
   (1) a flexible backing;
   (2) abrasive grain according to claim 1; and
   (3) adhesive bonding said abrasive grain to said backing.

4. A coated abrasive product according to claim 3, wherein the flexible backing is cloth; the adhesive comprises a making coat of phenolic resin comprising a calcium carbonate filler and a size coat of phenolic resin comprising a reactive filler.

5. A coated abrasive product according to claim 4, comprising a base layer of abrasive grain, under said abrasive grain comprising reduced titanium oxide.

6. A bonded abrasive product comprising:
   (1) abrasive grain according to claim 1; and
   (2) a bonding matrix, bonding together the abrasive grain.

7. A bonded abrasive product according to claim 6, wherein the bonding matrix is phenolic resin.

8. A bonded abrasive product according to claim 6, wherein the bonding matrix is vitrified ceramic bond.

9. A bonded abrasive product according to claim 6, in the form of a grinding wheel.

* * * * *